US012812550B2

(12) United States Patent
Wang et al.

(10) Patent No.: US 12,812,550 B2
(45) Date of Patent: Nov. 24, 2026

(54) DOWNLINK TRANSMIT POWER CONTROL METHOD AND APPARATUS

(71) Applicant: VIVO MOBILE COMMUNICATION CO., LTD., Chang'an (CN)

(72) Inventors: Huan Wang, Chang'an (CN); Jinhua Liu, Chang'an (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 315 days.

(21) Appl. No.: 18/593,322

(22) Filed: Mar. 1, 2024

(65) Prior Publication Data

US 2024/0205836 A1 Jun. 20, 2024

Related U.S. Application Data

(63) Continuation of application No. PCT/CN2022/115445, filed on Aug. 29, 2022.

(30) Foreign Application Priority Data

Sep. 3, 2021 (CN) ......................... 202111032684.X

(51) Int. Cl.
*H04W 52/14* (2009.01)
*H04W 52/08* (2009.01)
*H04W 52/18* (2009.01)

(52) U.S. Cl.
CPC ......... *H04W 52/143* (2013.01); *H04W 52/08* (2013.01); *H04W 52/18* (2013.01)

(58) Field of Classification Search
CPC ............... H04W 52/143; H04W 52/18; H04W 52/38; H04W 52/248; H04W 52/08; H04W 52/46
See application file for complete search history.

(56) References Cited

U.S. PATENT DOCUMENTS

2013/0208604 A1* 8/2013 Lee ........................ H04W 24/10 370/252
2018/0035389 A1 2/2018 Hessler et al.
(Continued)

FOREIGN PATENT DOCUMENTS

CN 110087296 A 8/2019
CN 111182618 A 5/2020
(Continued)

OTHER PUBLICATIONS

Samsung, "Enhancements to Timing, Power Control and CLI for NR IAB", 3GPP TSG RAN WG1 #106-e, R1-2106908, e-Meeting, Aug. 16-27, 2021, Total pp. 7 (Year: 2021) (Year: 2021).*
(Continued)

*Primary Examiner* — Shah M Rahman
(74) *Attorney, Agent, or Firm* — Perilla Knox & Hildebrandt LLP; Kenneth A. Knox

(57) ABSTRACT

This application discloses a downlink transmit power control method and apparatus. The downlink transmit power control method in embodiments of this application includes: receiving, by a child node, a downlink transmission carrying a measurement signal and sent by a parent node on a reference resource; determining, by the child node, a power adjustment value of downlink transmit power of the parent node based on a measurement result of the measurement signal; and sending, by the child node, a power adjustment command to the parent node, where the power adjustment command is used to indicate the power adjustment value.

19 Claims, 4 Drawing Sheets

(56) References Cited

U.S. PATENT DOCUMENTS

| | | | | |
|---|---|---|---|---|
| 2019/0239238 | A1* | 8/2019 | Calabrese | H04W 28/16 |
| 2020/0053655 | A1 | 2/2020 | Ghosh et al. | |
| 2020/0336986 | A1* | 10/2020 | Chen | H04W 52/325 |
| 2021/0274449 | A1 | 9/2021 | Choi et al. | |
| 2021/0345324 | A1* | 11/2021 | Liu | H04W 72/23 |
| 2021/0352643 | A1* | 11/2021 | Ahn | H04W 72/044 |
| 2022/0369309 | A1* | 11/2022 | Li | H04W 72/0446 |
| 2022/0394737 | A1* | 12/2022 | Liu | H04B 7/15542 |
| 2023/0080162 | A1* | 3/2023 | Ghanbarinejad | H04W 52/46 455/522 |
| 2023/0318677 | A1* | 10/2023 | Wang | H04B 7/0478 375/267 |

FOREIGN PATENT DOCUMENTS

| | | | | | |
|---|---|---|---|---|---|
| JP | 2005012848 | A | | 1/2005 | |
| WO | WO-2018232090 | A1 | * | 12/2018 | H04B 7/066 |
| WO | 2020067656 | A1 | | 4/2020 | |
| WO | 2021159467 | A1 | | 8/2021 | |

OTHER PUBLICATIONS

Lenovo et al., "Timing, interference, and power control in enhanced IAB systems", 3GPP TSG RAN WG1 Meeting #104-e, R1-2107189, e-Meeting, May 10-27, 2021, Total pp. 12 (Year: 2021) (Year: 2021).*

International Search Report for International Application No. PCT/CN2022/115445 of Nov. 28, 2022.

First Office Action for CN Patent Application No. 202111032684.X of May 16, 2025.

Extended European Search Report for EP Patent Application No. 22863367.3 of Nov. 27, 2024.

VIVO, 3GPP TSG RAN WG1, "Other enhancements for simultaneous operation of child and parent links," R1-2106618, e-Meeting, Aug. 16-27, 2021. [Online]. Available: https://www.3gpp.org.

3GPP, Technical Specification Group Radio Access Network; NR; Radio Resource Control (RRC) protocol specification (Release 16), 3GPP TS 38.331, V16.2.0, Sep. 2020. [Online]. Available: https://www.3gpp.org.

* cited by examiner

DOWNLINK TRANSMIT POWER CONTROL METHOD AND APPARATUS

CROSS-REFERENCE TO RELATED APPLICATIONS

This application is a Bypass Continuation Application of PCT International Application No. PCT/CN2022/115445 filed on Aug. 29, 2022, which claims priority to Chinese Patent Application No. 202111032684.X, filed in China on Sep. 3, 2021, which is incorporated herein by reference in its entirety.

TECHNICAL FIELD

This application pertains to the field of wireless communications technologies, and specifically relates to a downlink transmit power control method and apparatus.

BACKGROUND

An integrated access backhaul (IAB) system is a technology that began to be standardized in new radio (NR) Rel-16. The IAB system is introduced to resolve insufficient deployment of wired transmission networks when access points are densely deployed. In other words, when there is no wired transmission network, an access point can rely on a wireless backhaul.

An IAB node includes a distributed unit (DU) function part and a mobile termination (MT) function part. When the DU and the MT perform reception simultaneously, if the DU and the MT share one radio frequency chain or antenna panel, a difference in received power of the two units is required to be within a predetermined range. For example, received signal strength of the two units is nearly the same, or a difference in received signal strength thereof is within an expected range. Otherwise, the received signal strength of the two units does not match a requirement of a receiver, and demodulation performance of the DU or the MT is affected. In addition, when the DU and the MT perform transmission and reception simultaneously, the reception and transmission by the DU interfere with the reception by the MT, and the reception by the MT also interferes with the reception by the DU.

In the related art, an access point (that is, an IAB node) may send a power adjustment (desired power adjustment) command to its upstream access point (parent IAB node), and the upstream access point adjusts downlink (DL) transmit power according to the power adjustment command, to alleviate the foregoing power spectral density imbalance and interference problems.

However, the solution in the related art does not clarify how to determine a power adjustment value and how to adjust DL transmit power according to the power adjustment command.

SUMMARY

According to a first aspect, a downlink transmit power control method is provided and includes:

receiving, by a child node, a downlink transmission carrying a measurement signal and sent by a parent node on a reference resource;

determining, by the child node, a power adjustment value of downlink transmit power of the parent node based on a measurement result of the measurement signal; and sending, by the child node, a power adjustment command to the parent node, where the power adjustment command is used to indicate the power adjustment value.

According to a second aspect, a downlink transmit power control method is provided and includes:

sending, by a parent node on a reference resource, a downlink transmission carrying a measurement signal to a child node;

receiving, by the parent node, a power adjustment command sent by the child node, where the power adjustment command is used to indicate a power adjustment value, and the power adjustment value is determined by the child node based on a measurement result of the measurement signal; and adjusting, by the parent node, downlink transmit power based on reference power and the power adjustment value.

According to a third aspect, a downlink transmit power control apparatus is provided and includes:

a first receiving module, configured to receive a downlink transmission carrying a measurement signal and sent by a parent node on a reference resource;

a first determining module, configured to determine a power adjustment value of downlink transmit power of the parent node based on a measurement result of the measurement signal; and a first sending module, configured to send a power adjustment command to the parent node, where the power adjustment command is used to indicate the power adjustment value.

According to a fourth aspect, a downlink transmit power control apparatus is provided and includes:

a first sending module, configured to send, on a reference resource, a downlink transmission carrying a measurement signal to a child node;

a first receiving module, configured to receive a power adjustment command sent by the child node, where the power adjustment command is used to indicate a power adjustment value, and the power adjustment value is determined by the child node based on a measurement result of the measurement signal; and a transmit power adjustment module, configured to adjust downlink transmit power based on reference power and the power adjustment value.

According to a fifth aspect, a communication device is provided. The communication device includes a processor, a memory, and a program or instructions stored in the memory and capable of running on the processor. When the program or instructions are executed by the processor, the steps of the downlink transmit power control method according to the first aspect or the second aspect are implemented.

According to a sixth aspect, a communication device is provided. The communication device includes a processor and a communication interface. The communication interface is configured to receive a downlink transmission carrying a measurement signal and sent by a parent node on a reference resource. The processor is configured to determine a power adjustment value of downlink transmit power of the parent node based on a measurement result of the measurement signal. The communication interface is further configured to send a power adjustment command to the parent node, where the power adjustment command is used to indicate the power adjustment value.

According to a seventh aspect, a communication device is provided. The communication device includes a processor and a communication interface. The communication interface is configured to: send, on a reference resource, a downlink transmission carrying a measurement signal to a child node; and receive a power adjustment command sent by the child node, where the power adjustment command is used to indicate a power adjustment value, and the power adjustment value is determined by the child node based on a measurement result of the measurement signal. The processor is configured to adjust downlink transmit power based on reference power and the power adjustment value.

According to an eighth aspect, a readable storage medium is provided. The readable storage medium stores a program or instructions. When the program or instructions are executed by a processor, the steps of the method according to the first aspect are implemented, or the steps of the method according to the second aspect are implemented.

According to a ninth aspect, a chip is provided. The chip includes a processor and a communication interface. The communication interface is coupled to the processor. The processor is configured to run a program or instructions to implement the method according to the first aspect or implement the method according to the second aspect.

According to a tenth aspect, a computer program product is provided. The computer program product is stored in a non-volatile storage medium. The computer program product is executed by at least one processor to implement the steps of the downlink transmit power control method according to the first aspect or the second aspect.

According to an eleventh aspect, a communication device is provided and configured to perform the downlink transmit power control method according to the first aspect or the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
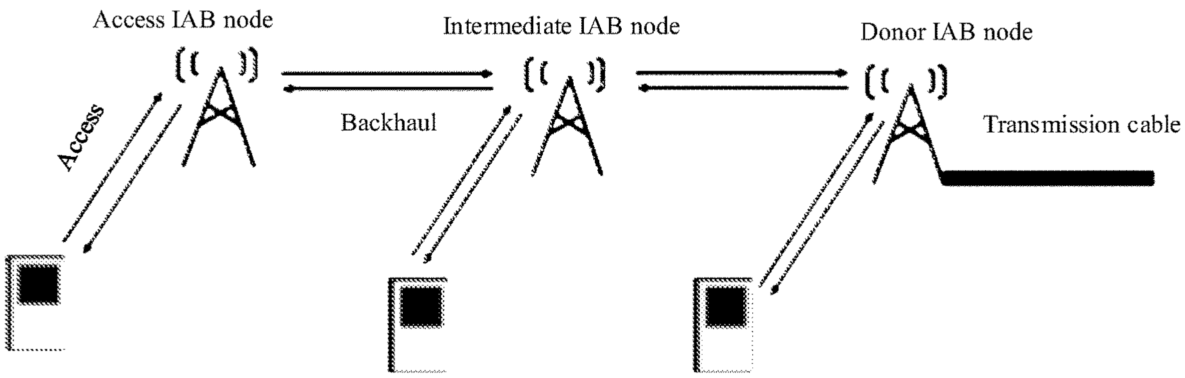
FIG. 1 is a schematic diagram of a structure of an IAB system according to an embodiment of this application.
Figure 2:
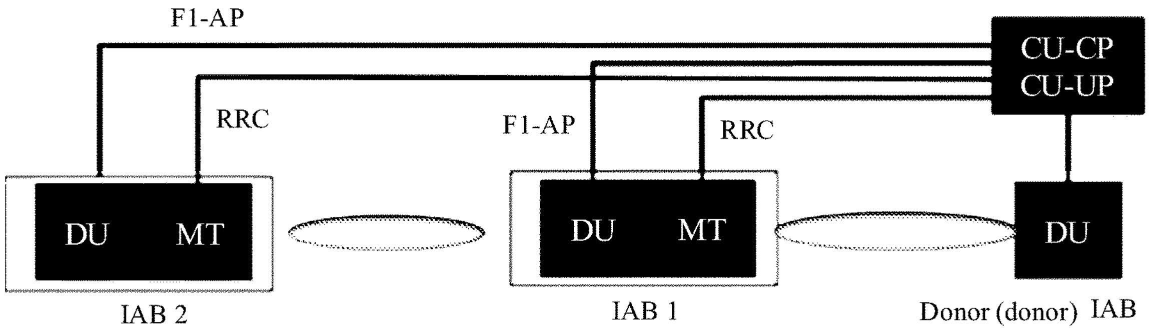
FIG. 2 is a schematic diagram of a CU-DU structure of an IAB system according to an embodiment of this application.

FIG. 1 is a schematic diagram of a structure of an IAB system according to an embodiment of this application. FIG. 2 is a schematic diagram of a CU-DU structure of an IAB system according to an embodiment of this application. The IAB system includes a plurality of IAB nodes. An IAB node includes a distributed unit (DU) function part and a mobile termination (MT) function part. Relying on an MT, an access point (that is, an IAB node) can find an upstream access point (parent IAB node) and establish a wireless connection to a DU of the upstream access point. This wireless connection is referred to as a backhaul link. After an IAB node establishes a complete backhaul link, the IAB node enables its DU function, and the DU provides a cell service, that is, the DU can provide an access service for user equipment (UE). An integrated access backhaul loop includes a donor IAB node, and the donor IAB node is directly connected to a wired transmission network. In an integrated access backhaul loop, DUs of all IAB nodes are connected to a CU node. The CU node configures the DUs through the F1 application protocol (F1-AP) protocol and configures MTs through the RRC protocol. The donor IAB node does not have an MT function part.

A downlink transmit power control method and apparatus provided in embodiments of this application are hereinafter described in detail by using some embodiments and application scenarios thereof with reference to the accompanying drawings.

Figure 3:
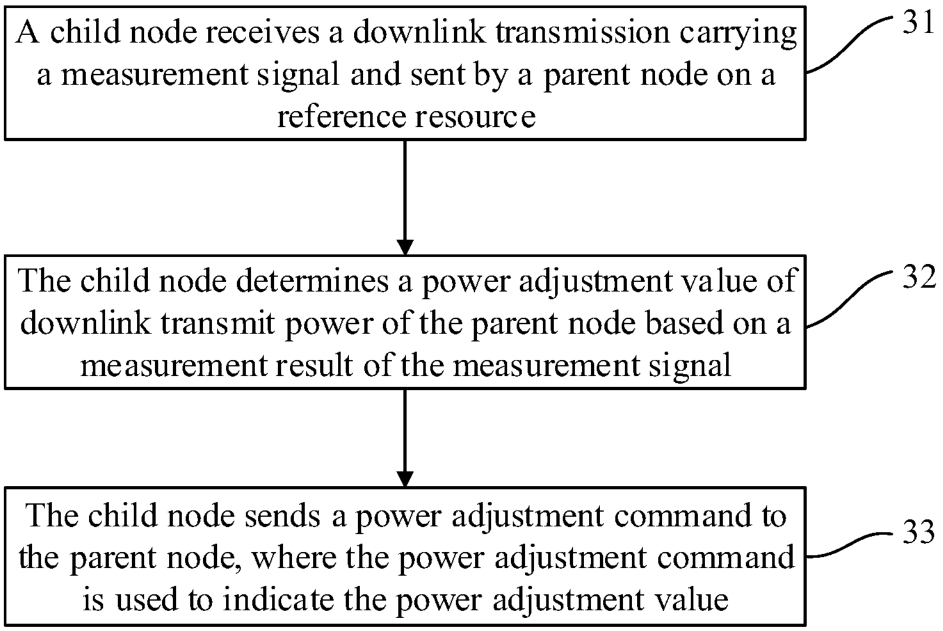
FIG. 3 is a schematic flowchart of a downlink transmit power control method according to an embodiment of this application.

Referring to FIG. 3, an embodiment of this application provides a downlink transmit power control method, including the following steps.

Step 31: A child node receives a downlink transmission carrying a measurement signal and sent by a parent node on a reference resource.

In this embodiment of this application, the child node and the parent node may be IAB nodes in an IAB system, or may be access points in other communications systems that require relay communication. The parent node is an upstream access point for an access point mentioned in the foregoing content.

In this embodiment of this application, the parent node and the child node have a consistent understanding of the reference resource.

Step 32: The child node determines a power adjustment value of downlink transmit power of the parent node based on a measurement result of the measurement signal.

In this embodiment of this application, the measurement result of the measurement signal may be a reference signal received power (RSRP) measurement result of the measurement signal, or a received signal strength indicator (RSSI) measurement result of the measurement signal, or other types of measurement results.

Step 33: The child node sends a power adjustment command to the parent node, where the power adjustment command is used to indicate the power adjustment value.

In this embodiment of this application, the parent node and the child node have a consistent understanding of the reference resource. The parent node sends the downlink transmission (DL transmission(s)) carrying the measurement signal on the reference resource; the child node determines the power adjustment value of the downlink transmit power of the parent node based on the measurement result of the measurement signal, and reports the power adjustment value to the parent node; and the parent node adjusts the downlink transmit power based on the power adjustment value, thereby ensuring that the parent node and the child node have a consistent understanding of the power adjustment, and ensuring reliability and effectiveness of the power adjustment.

In this embodiment of this application, the child node may report the power adjustment command according to at least one of the following solutions.

Solution 1: The child node triggers reporting.

EXAMPLE

The child node determines when the power adjustment command needs to be reported. The child node sends a scheduling request (SR) or a buffer status report (BSR) to request a reporting resource, and reports the power adjustment command on a resource allocated by the parent node or a centralized unit.

Alternatively, the child node determines when the power adjustment command needs to be reported. If the child node has a reporting resource, the child node reports the power adjustment command on a resource that has been allocated by the parent node or a centralized unit.

Triggering reporting may be triggering aperiodic or semi-persistent reporting.

Solution 2: The parent node or a centralized unit triggers reporting.

The parent node or the centralized unit determines when the child node needs to report the power adjustment command. The parent node or the centralized unit indicates a reporting resource, and the child node reports the power adjustment command on a resource allocated by the parent node or the centralized unit.

Triggering reporting may be triggering aperiodic or semi-persistent reporting.

Solution 3: Periodic reporting.

The parent node or a centralized unit indicates a reporting resource, and the child node reports the power adjustment command on a resource allocated by the parent node or the centralized unit.

The following describes a method for determining the reference resource.

The method for determining the reference resource may include at least one of the following solutions.

Solution 1: The child node determines the reference resource and indicates the reference resource to the parent node or a centralized unit (CU).

Optionally, the child node may explicitly indicate the reference resource to the parent node or the centralized unit. For example, the reference resource may be indicated by using a time offset Y relative to a time point X when the child node reports the power adjustment value, where the time offset Y is used to indicate that the reference resource is Y time units before the time point X.

Solution 2: The child node receives the reference resource indicated by the parent node or a centralized unit.

In other words, the reference resource is indicated by the parent node or the centralized unit. Optionally, the parent node or the centralized unit may explicitly indicate the reference resource.

Solution 3: The child node obtains the reference resource prescribed in a protocol.

In other words, the reference resource is prescribed in the protocol. For example, the protocol prescribes that the reference resource is a physical downlink control channel (PDCCH) scheduling a reporting resource for the power adjustment command.

In this embodiment of this application, optionally, the measurement result of the measurement signal is a measurement result of the measurement signal received at most recent N times or within a most recent T time, where N is a positive integer greater than or equal to 1.

Optionally, the measurement result of the measurement signal received at the most recent N times or within the most recent T time includes at least one of the following:

a measurement result of the measurement signal received at the most recent N times or within the most recent T time, relative to sending the power adjustment command by the child node;

a measurement result of the measurement signal received at the most recent N times or within the most recent T time, relative to requesting a reporting resource for sending the power adjustment command by the child node;

a measurement result of the measurement signal received at the most recent N times or within the most recent T time, relative to triggering the child node by the parent node to report the power adjustment command; and a measurement result of the measurement signal received at the most recent N times or within the most recent T time, relative to signaling of the parent node for allocating the reporting resource for sending the power adjustment command.

In this embodiment of this application, optionally, the measurement signal includes at least one of the following: a PDCCH, a physical downlink shared channel (PDSCH), a PDCCH demodulation reference signal (DMRS), a PDSCH DMRS, a synchronization signal and PBCH block (SSB), a secondary synchronization signal (SSS), a primary synchronization signal (PSS), a physical broadcast channel (PBCH) DMRS, and a channel state information reference signal (CSI-RS).

Optionally, if RSRP measurement is used, the measurement signal may include at least one of the following:

a primary synchronization signal (PSS) or an SSS;

a CSI-RS;

a DMRS;

a PDCCH DMRS;

a PDSCH DMRS; and a PBCH DMRS.

Optionally, if RSSI measurement is used, the measurement signal may include at least one of the following:

an SSB;

a PDSCH; and a PDCCH.

In this embodiment of this application, optionally, that the child node sends a power adjustment command to the parent node includes: the child node sends the power adjustment command to the parent node within a first preset time period from the reference resource, to ensure timeliness and accuracy of the power adjustment.

In some embodiments of this application, optionally, the measurement result of the measurement signal is a measurement result of the measurement signal within a second preset time period.

In this embodiment of this application, optionally, transmit power of the measurement signal does not change within the second preset time period. To be specific, the parent node sends, by using constant transmit power within the second preset time period, the downlink transmission carrying the measurement signal, and the child node determines the power adjustment value based on the measurement result of the measurement signal within the second preset time period. In this case, the power adjustment value may be an adjustment value relative to the constant power (that is, reference power).

In this embodiment of this application, optionally, the method further includes: the child node receives the second preset time period indicated by the parent node or a centralized unit. In other words, the parent node or the centralized unit indicates the second preset time period.

In this embodiment of this application, optionally, the method further includes: the child node receives a notification sent by the parent node or a centralized unit, where the notification is used to indicate that transmit power of the measurement signal changes. In other words, when transmit power of the parent node changes, the parent node or the centralized unit notifies the child node (or notifies an MT of the child node).

In this embodiment of this application, optionally, a range of the second preset time period includes at least a time period from M time units after a power adjustment command is sent last time to N time units before a power adjustment command is sent this time, where $M \geq 0$, and $N \geq 0$. In other words, the parent node keeps the downlink transmit power unchanged until reception of the power adjustment command for one power adjustment is completed.

In this embodiment of this application, optionally, the downlink transmission is a specific downlink transmission. For example, the specific downlink transmission includes at least one of the following:

a synchronization signal and PBCH block (SSB) transmission;

an SSS transmission;

a PSS transmission;

a PBCH DMRS transmission;

a CSI-RS or periodic CSI-RS transmission;

an SSB transmission for radio link monitoring (RLM);

a CSI-RS transmission for RLM; and a transmission of a PDCCH in control resource set (CORESET) #0.

In this embodiment of this application, optionally, before the child node determines the power adjustment value of the downlink transmit power of the parent node based on the measurement result of the measurement signal, the method further includes: when the downlink transmission carries a plurality of measurement signals, the child node selects, based on predefined or preconfigured priorities of the plurality of measurement signals, the measurement signal used to determine the power adjustment value.

For example, the child node may select, in descending order of priorities, the measurement signal used to determine the power adjustment value. For example, the descending order of priorities is: a latest PDSCH, a CSI-RS, a PDCCH in CORSET X, an SSB, and the like.

In some embodiments of this application, optionally, that the child node determines a power adjustment value of downlink transmit power of the parent node based on a measurement result of the measurement signal includes:

the child node determines the power adjustment value based on the measurement result of the measurement signal and at least one of the following:

transmit power of the measurement signal, indicated by the parent node; and preset reference power.

In this embodiment of this application, optionally, the parent node indicates the transmit power of the measurement signal semi-statically or dynamically. For example, the transmit power of the measurement signal within a time period is indicated by using F1, radio resource control (RRC), a media access control control element (MAC CE), or downlink control information (DCI), where the DCI supports indicating transmit power of each downlink transmission.

In this embodiment of this application, optionally, the preset reference power is prescribed in a protocol, configured by a centralized unit, or indicated by the parent node. For example, the protocol prescribes that the preset reference power is transmit power for transmitting an SSB, an SSS, a PSS, or a PBCH DMRS.

In this embodiment of this application, optionally, that the child node determines a power adjustment value of downlink transmit power of the parent node based on a measurement result of the measurement signal includes: the child node determines the power adjustment value of the downlink transmit power of the parent node based on measurement results of measurement signals carried by downlink transmissions sent on a plurality of reference resources.

Further optionally, that the child node determines the power adjustment value of the downlink transmit power of the parent node based on measurement results of measurement signals carried by downlink transmissions sent on a plurality of reference resources includes:

the child node filters, by using a preset filter, the measurement results of the measurement signals carried by the downlink transmissions sent on the plurality of reference resources, to obtain a filtered measurement result; and the child node determines the power adjustment value of the downlink transmit power of the parent node based on the filtered measurement result; or the child node obtains a plurality of power adjustment values based on the measurement results of the measurement signals carried by the downlink transmissions sent on the plurality of reference resources; and the child node filters the plurality of power adjustment values based on a preset filter, to obtain the power adjustment value of the downlink transmit power of the parent node.

In this embodiment of this application, a parameter of the preset filter may be obtained in at least one of the following manners:

the child node determines the parameter of the preset filter, and indicates the parameter to the parent node or a centralized unit;

the child node receives the parameter of the preset filter indicated by the parent node or the centralized unit; and the child node obtains the parameter of the preset filter prescribed in a protocol.

In the foregoing manners, the child node and the parent node can have a unified understanding of the parameter of the filter.

In this embodiment of this application, optionally, the power adjustment value is to adjust an upper limit, a lower limit, and/or an average value of the downlink transmit power.

In this embodiment of this application, optionally, at least one granularity is used in the power adjustment command to indicate the power adjustment value. For example, if the power adjustment value is 10 watts and one adjustment granularity is 5 watts, the power adjustment value is indicated by two granularities.

In this embodiment of this application, optionally, that the child node sends a power adjustment command to the parent node includes: the child node sends a plurality of power adjustment commands to the parent node, where a sum of values indicated in the plurality of power adjustment commands is the power adjustment value. For example, the child node sends two power adjustment commands to the parent node. A power adjustment value carried in the first power adjustment command is 5 watts, and a power adjustment value carried in the second power adjustment command is 10 watts. In this case, a final power adjustment value is 15 watts.

In this embodiment of this application, optionally, that the child node sends a power adjustment command to the parent node includes:

the child node determines, based on a preset table, a sequence number corresponding to the power adjustment value, where the table includes a plurality of correspondences, and the correspondences are correspondences between power adjustment values and sequence numbers; and the child node sends, to the parent node, the power adjustment command carrying the sequence number corresponding to the power adjustment value.

In this embodiment of this application, optionally, the method further includes: the child node receives the table sent by a centralized unit. In other words, the centralized unit preconfigures a correspondence between the power adjustment value and the sequence number for the child node and the parent node.

In this embodiment of this application, optionally, in a case of a carrier aggregation, the power adjustment command includes a power adjustment value corresponding to each aggregated carrier, and the power adjustment value corresponding to each aggregated carrier is arranged based on a sequence number of each aggregated carrier.

In this embodiment of this application, optionally, the power adjustment command may be in at least one of the following forms: a MAC CE, uplink control information (UCI), a scheduling request (SR), a physical random access channel (PRACH), and the like.

Figure 4:
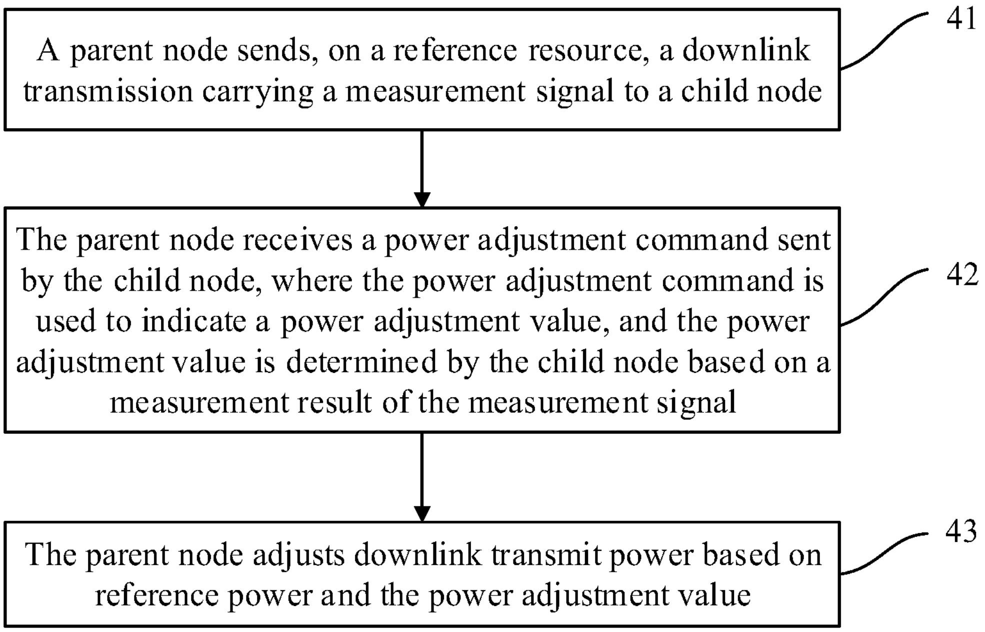
FIG. 4 is a schematic flowchart of another downlink transmit power control method according to an embodiment of this application.

Referring to FIG. 4, an embodiment of this application further provides a downlink transmit power control method, including the following steps.

Step 41: A parent node sends, on a reference resource, a downlink transmission carrying a measurement signal to a child node.

Step 42: The parent node receives a power adjustment command sent by the child node, where the power adjustment command is used to indicate a power adjustment value, and the power adjustment value is determined by the child node based on a measurement result of the measurement signal.

Step 43: The parent node adjusts downlink transmit power based on reference power and the power adjustment value.

In this embodiment of this application, the parent node and the child node have a consistent understanding of the reference resource. The parent node sends the downlink transmission carrying the measurement signal on the reference resource; the child node determines the power adjustment value of the downlink transmit power of the parent node based on the measurement result of the measurement signal, and reports the power adjustment value to the parent node; and the parent node adjusts the downlink transmit power based on the reference power and the power adjustment value, thereby ensuring that the parent node and the child node have a consistent understanding of the power adjustment, and ensuring reliability and effectiveness of the power adjustment.

In some embodiments of this application, the reference power is transmit power of the measurement signal.

Optionally, the reference resource may be obtained in at least one of the following manners:

the parent node receives the reference resource indicated by the child node;

the parent node determines the reference resource;

the parent node receives the reference resource indicated by a centralized unit; and the parent node obtains the reference resource prescribed in a protocol.

Optionally, the measurement signal includes at least one of the following: a PDCCH, a PDSCH, a PDCCH DMRS, a PDSCH DMRS, an SSB, an SSS, a PSS, a PBCH DMRS, and a CSI-RS.

In some embodiments of this application, optionally, that a parent node sends, on a reference resource, a downlink transmission carrying a measurement signal to a child node includes: the parent node sends the measurement signal by using constant transmit power within a second preset time period.

Optionally, the method further includes: the parent node indicates the second preset time period to the child node.

Optionally, the method further includes: when transmit power of the measurement signal changes, the parent node sends, to the child node, a notification used to indicate that the transmit power of the measurement signal changes.

Optionally, the downlink transmission is a specific downlink transmission.

In some embodiments of this application, optionally, the reference power is preset reference power.

Optionally, the method further includes: the parent node indicates the transmit power of the measurement signal to the child node semi-statically or dynamically.

Optionally, the preset reference power may be obtained in at least one of the following manners:

the parent node indicates the preset reference power to the child node;

the parent node obtains the preset reference power indicated by a centralized unit; and the parent node obtains the preset reference power prescribed in a protocol.

Optionally, the method further includes: the parent node filters, by using a preset filter, transmit power of measurement signals carried by downlink transmissions on a plurality of reference resources, and uses filtered transmit power as the reference power.

Optionally, a parameter of the preset filter may be obtained in at least one of the following manners:

the parent node receives the parameter of the preset filter sent by the child node;

the parent node determines the parameter of the preset filter;

the parent node receives the parameter of the preset filter indicated by a centralized unit; and the parent node obtains the parameter of the preset filter prescribed in a protocol.

Optionally, that the parent node adjusts downlink transmit power based on reference power and the power adjustment value includes: the parent node adjusts an upper limit, a lower limit, and/or an average value of the downlink transmit power based on the reference power and the power adjustment value.

Optionally, that the parent node adjusts downlink transmit power based on reference power and the power adjustment value includes: the parent node adjusts energy of each resource element, power spectral density, or total transmit power of the downlink transmission based on the reference power and the power adjustment value.

Optionally, that the parent node receives a power adjustment command sent by the child node includes: the parent node receives a plurality of power adjustment commands sent by the child node, where a sum of values indicated in the plurality of power adjustment commands is the power adjustment value.

Optionally, the power adjustment command carries a sequence number corresponding to the power adjustment value; and after the parent node receives the power adjustment command sent by the child node, the method further includes: the parent node determines, based on a preset table, the power adjustment value corresponding to the sequence number in the power adjustment command, where the table includes a plurality of correspondences, and the correspondences are correspondences between power adjustment values and sequence numbers.

Optionally, in a case of a carrier aggregation, the power adjustment command includes a power adjustment value of each aggregated carrier, and the power adjustment value of each aggregated carrier is arranged based on a sequence number of each aggregated carrier.

The following describes the downlink transmit power control method of this application by using examples with reference to specific embodiments.

Embodiment 1

An RSRP value measured by a child node in a downlink transmission carrying a measurement signal on a reference resource is RSRP #1, and an RSRP value expected to be received by the child node is RSRP #0. The child node determines that a power adjustment value is RSRP #0-RSRP #1.

A parent node adjusts downlink transmit power to "P0+Power adjustment value", where P0 is reference power for the power adjustment.

Embodiment 2

An RSRP value measured by a child node in a downlink transmission carrying a measurement signal on a reference resource is RSRP #1, transmit power of the downlink transmission indicated by a parent node or a centralized unit is P1, an RSRP value expected to be received is RSRP #0, and preset reference power is P0. The child node determines that a power adjustment value is (P1-P0)+(RSRP #0-RSRP #1).

The parent node adjusts downlink transmit power to "P0+Power adjustment value".

Embodiment 3

A child node filters (for example, averages) measurement results on a plurality of reference resources, and determines a power adjustment value based on a filtered measurement result and received signal strength expected by the child node.

A parent node performs the same filtering on the transmit power on the reference resources, and filtered transmit power is reference power. The parent node determines downlink transmit power based on the reference power and the power adjustment value.

It should be noted that the downlink transmit power control method provided in the embodiments of this application may be performed by a downlink transmit power control apparatus, or a control module configured to perform the downlink transmit power control method in the downlink transmit power control apparatus. A downlink transmit power control apparatus provided in an embodiment of this application is described by assuming that the downlink transmit power control method in the embodiments of this application is performed by the downlink transmit power control apparatus.

Figure 5:
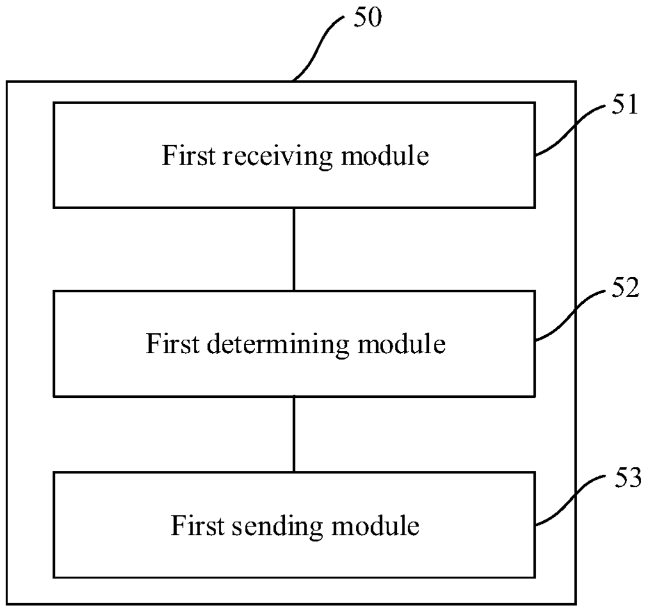
FIG. 5 is a schematic diagram of a structure of a downlink transmit power control apparatus according to an embodiment of this application.

Referring to FIG. 5, an embodiment of this application further provides a downlink transmit power control apparatus 50, including:

a first receiving module 51, configured to receive a downlink transmission carrying a measurement signal and sent by a parent node on a reference resource;

a first determining module 52, configured to determine a power adjustment value of downlink transmit power of the parent node based on a measurement result of the measurement signal; and a first sending module 53, configured to send a power adjustment command to the parent node, where the power adjustment command is used to indicate the power adjustment value.

In this embodiment of this application, the parent node and a child node have a consistent understanding of the reference resource. The parent node sends the downlink transmission carrying the measurement signal on the reference resource; the child node determines the power adjustment value of the downlink transmit power of the parent node based on the measurement result of the measurement signal, and reports the power adjustment value to the parent node; and the parent node adjusts the downlink transmit power based on the reference power and the power adjustment value, thereby ensuring that the parent node and the child node have a consistent understanding of the power adjustment, and ensuring reliability and effectiveness of the power adjustment.

In this embodiment of this application, optionally, the reference resource is obtained in at least one of the following manners:

- the child node determines the reference resource and indicates the reference resource to the parent node or a centralized unit;
- the reference resource is indicated by the parent node or the centralized unit; and
- the reference resource is prescribed in a protocol.

In this embodiment of this application, optionally, the measurement result of the measurement signal is a measurement result of the measurement signal received at most recent N times or within a most recent T time, where N is a positive integer greater than or equal to 1.

In this embodiment of this application, optionally, the measurement result of the measurement signal received at the most recent N times or within the most recent T time includes at least one of the following:

- a measurement result of the measurement signal received at the most recent N times or within the most recent T time, relative to sending the power adjustment command by the child node;
- a measurement result of the measurement signal received at the most recent N times or within the most recent T time, relative to requesting a reporting resource for sending the power adjustment command by the child node;
- a measurement result of the measurement signal received at the most recent N times or within the most recent T time, relative to triggering the child node by the parent node to report the power adjustment command; and
- a measurement result of the measurement signal received at the most recent N times or within the most recent T time, relative to signaling of the parent node for allocating the reporting resource for sending the power adjustment command.

In this embodiment of this application, optionally, the measurement signal includes at least one of the following: a PDCCH, a PDSCH, a PDCCH DMRS, a PDSCH DMRS, an SSB, an SSS, a PSS, a PBCH DMRS, and a CSI-RS.

Optionally, the first sending module is configured to send the power adjustment command to the parent node within a first preset time period from the reference resource.

Optionally, the measurement result of the measurement signal is a measurement result of the measurement signal within a second preset time period.

Optionally, transmit power of the measurement signal does not change within the second preset time period.

Optionally, the apparatus further includes:

- a second receiving module, configured to receive the second preset time period indicated by the parent node or a centralized unit.

Optionally, a range of the second preset time period includes at least a time period from M time units after a power adjustment command is sent last time to N time units before a power adjustment command is sent this time, where $M \geq 0$, and $N \geq 0$.

Optionally, the apparatus further includes:

- a third receiving module, configured to receive a notification sent by the parent node or a centralized unit, where the notification is used to indicate that transmit power of the measurement signal changes.

Optionally, the downlink transmission is a specific downlink transmission.

Optionally, the apparatus further includes:

- a selection module, configured to: when the downlink transmission carries a plurality of measurement signals, select, based on predefined or preconfigured priorities of the plurality of measurement signals, the measurement signal used to determine the power adjustment value.

Optionally, the first determining module is configured to determine the power adjustment value based on the measurement result of the measurement signal and at least one of the following:

- transmit power of the measurement signal, indicated by the parent node; and
- preset reference power.

Optionally, the parent node indicates the transmit power of the measurement signal semi-statically or dynamically.

Optionally, the preset reference power is prescribed in a protocol, configured by a centralized unit, or indicated by the parent node.

Optionally, the first determining module is configured to determine the power adjustment value of the downlink transmit power of the parent node based on measurement results of measurement signals carried by downlink transmissions sent on a plurality of reference resources.

Optionally, the first determining module is configured to: filter, by using a preset filter, the measurement results of the measurement signals carried by the downlink transmissions sent on the plurality of reference resources, to obtain a filtered measurement result; and determine the power adjustment value of the downlink transmit power of the parent node based on the filtered measurement result;

or

- the first determining module is configured to: obtain a plurality of power adjustment values based on the measurement results of the measurement signals carried by the downlink transmissions sent on the plurality of reference resources; and filter the plurality of power adjustment values based on a preset filter, to obtain the power adjustment value of the downlink transmit power of the parent node.

Optionally, a parameter of the preset filter is determined in one of the following manners:

- the child node determines the parameter of the preset filter and indicates the parameter to the parent node or a centralized unit;
- the parameter of the preset filter is indicated by the parent node or the centralized unit; and
- the parameter of the preset filter is prescribed in a protocol.

Optionally, the power adjustment value is to adjust an upper limit, a lower limit, and/or an average value of the downlink transmit power.

Optionally, at least one granularity is used in the power adjustment command to indicate the power adjustment value.

Optionally, the first sending module is configured to send a plurality of power adjustment commands to the parent node, where a sum of values indicated in the plurality of power adjustment commands is the power adjustment value.

Optionally, the first sending module is configured to: determine, based on a preset table, a sequence number corresponding to the power adjustment value, where the table includes a plurality of correspondences, and the correspondences are correspondences between power adjustment values and sequence numbers; and send, to the parent node, the power adjustment command carrying the sequence number corresponding to the power adjustment value.

Optionally, in a case of a carrier aggregation, the power adjustment command includes a power adjustment value corresponding to each aggregated carrier, and the power adjustment value corresponding to each aggregated carrier is arranged based on a sequence number of each aggregated carrier.

The apparatus provided in this embodiment of this application can implement each process implemented by the method embodiment in FIG. 3, with the same technical effect achieved. To avoid repetition, details are not described herein again.

Figure 6:
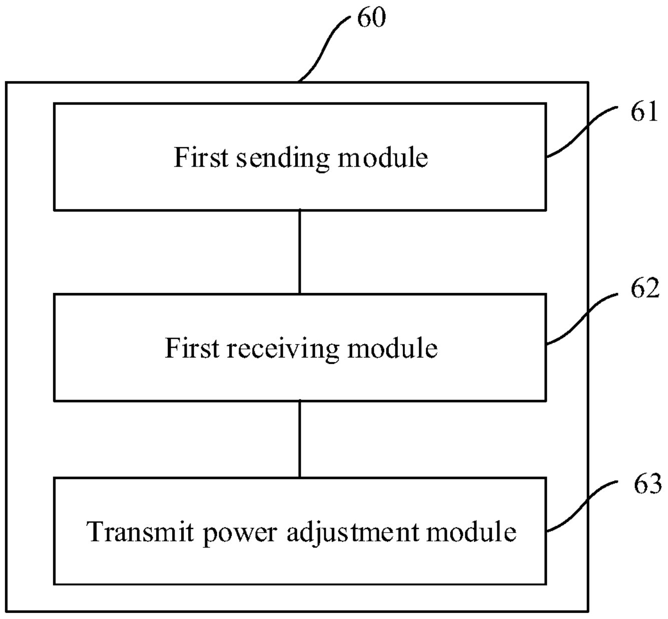
FIG. 6 is a schematic diagram of a structure of a downlink transmit power control apparatus according to another embodiment of this application.

Referring to FIG. 6, an embodiment of this application further provides a downlink transmit power control apparatus 60, including:

a first sending module 61, configured to send, on a reference resource, a downlink transmission carrying a measurement signal to a child node;

a first receiving module 62, configured to receive a power adjustment command sent by the child node, where the power adjustment command is used to indicate a power adjustment value, and the power adjustment value is determined by the child node based on a measurement result of the measurement signal; and a transmit power adjustment module 63, configured to adjust downlink transmit power based on reference power and the power adjustment value.

Optionally, the reference power is transmit power of the measurement signal.

Optionally, the reference resource is obtained in at least one of the following manners:

the reference resource is indicated by the child node;

the reference resource is determined by a parent node;

the reference resource is indicated by a centralized unit; and the reference resource is prescribed in a protocol.

Optionally, the measurement signal includes at least one of the following: a PDCCH, a PDSCH, a PDCCH DMRS, a PDSCH DMRS, an SSB, an SSS, a PSS, a PBCH DMRS, and a CSI-RS.

Optionally, the first sending module is configured to send the measurement signal by using constant transmit power within a second preset time period.

Optionally, the apparatus further includes:

a first indication module, configured to indicate the second preset time period to the child node.

Optionally, the apparatus further includes:

a second sending module, configured to: when transmit power of the measurement signal changes, send, to the child node, a notification used to indicate that the transmit power of the measurement signal changes.

Optionally, the downlink transmission is a specific downlink transmission.

Optionally, the reference power is preset reference power.

Optionally, the apparatus further includes:

a second indication module, configured to indicate the transmit power of the measurement signal to the child node semi-statically or dynamically.

Optionally, the preset reference power is obtained in at least one of the following manners:

the preset reference power is determined by the parent node and indicated to the child node;

the preset reference power is indicated by a centralized unit; and the preset reference power is prescribed in a protocol.

Optionally, the apparatus further includes:

a filtering module, configured to filter, by using a preset filter, transmit power of measurement signals carried by downlink transmissions on a plurality of reference resources, and use filtered transmit power as the reference power.

Optionally, a parameter of the preset filter is obtained in at least one of the following manners:

the parameter of the preset filter is sent by the child node;

the parameter of the preset filter is determined by the parent node;

the parameter of the preset filter is indicated by a centralized unit; and the parameter of the preset filter is prescribed in a protocol.

Optionally, the transmit power adjustment module is configured to adjust an upper limit, a lower limit, and/or an average value of the downlink transmit power based on the reference power and the power adjustment value.

Optionally, the transmit power adjustment module is configured to adjust energy of each resource element, power spectral density, or total transmit power of the downlink transmission based on the reference power and the power adjustment value.

Optionally, the first receiving module is configured to receive a plurality of power adjustment commands sent by the child node, where a sum of values indicated in the plurality of power adjustment commands is the power adjustment value.

Optionally, the power adjustment command carries a sequence number corresponding to the power adjustment value; and the apparatus further includes:

a determining module, configured to determine, based on a preset table, the power adjustment value corresponding to the sequence number in the power adjustment command, where the table includes a plurality of correspondences, and the correspondences are correspondences between power adjustment values and sequence numbers.

Optionally, in a case of a carrier aggregation, the power adjustment command includes a power adjustment value of each aggregated carrier, and the power adjustment value of each aggregated carrier is arranged based on a sequence number of each aggregated carrier.

The apparatus provided in this embodiment of this application can implement each process implemented by the method embodiment in FIG. 4, with the same technical effect achieved. To avoid repetition, details are not described herein again.

Figure 7:
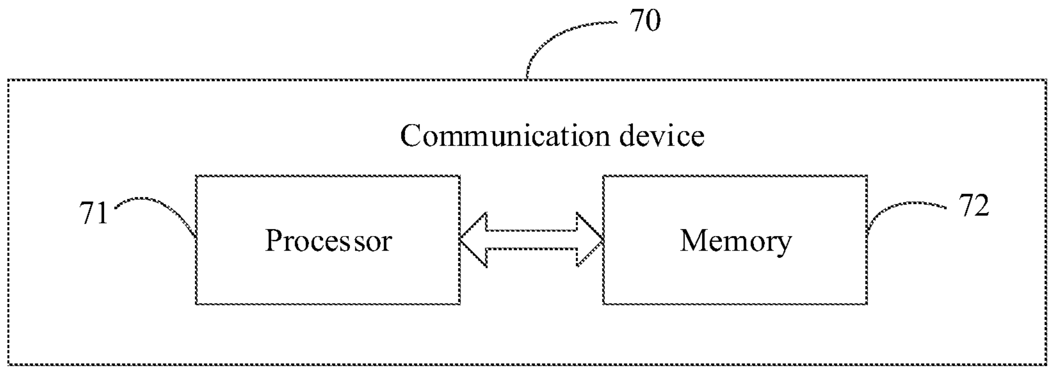
FIG. 7 is a schematic diagram of a structure of a communication device according to an embodiment of this application.

As shown in FIG. 7, an embodiment of this application further provides a communication device 70, including a processor 71, a memory 72, and a program or instructions stored in the memory 72 and capable of running on the processor 71. When the program or instructions are executed by the processor 71, each process of the foregoing embodiment of the downlink transmit power control method is implemented, with the same technical effect achieved. To avoid repetition, details are not described herein again.

An embodiment of this application further provides a communication device, including a processor and a communication interface. The communication interface is configured to receive a downlink transmission carrying a measurement signal and sent by a parent node on a reference resource. The processor is configured to determine a power adjustment value of downlink transmit power of the parent node based on a measurement result of the measurement signal. The communication interface is further configured to send a power adjustment command to the parent node, where the power adjustment command is used to indicate the power adjustment value. Alternatively, the communication interface is configured to: send, on a reference resource, a downlink transmission carrying a measurement signal to a child node; and receive a power adjustment command sent by the child node, where the power adjustment command is used to indicate a power adjustment value, and the power adjustment value is determined by the child node based on a measurement result of the measurement signal. The processor is configured to adjust downlink transmit power based on reference power and the power adjustment value.

The communication device embodiment corresponds to the foregoing method embodiment of the communication device, and each implementation process and implementation of the foregoing method embodiment can be applied to the communication device embodiment, with the same technical effect achieved.

Figure 8:
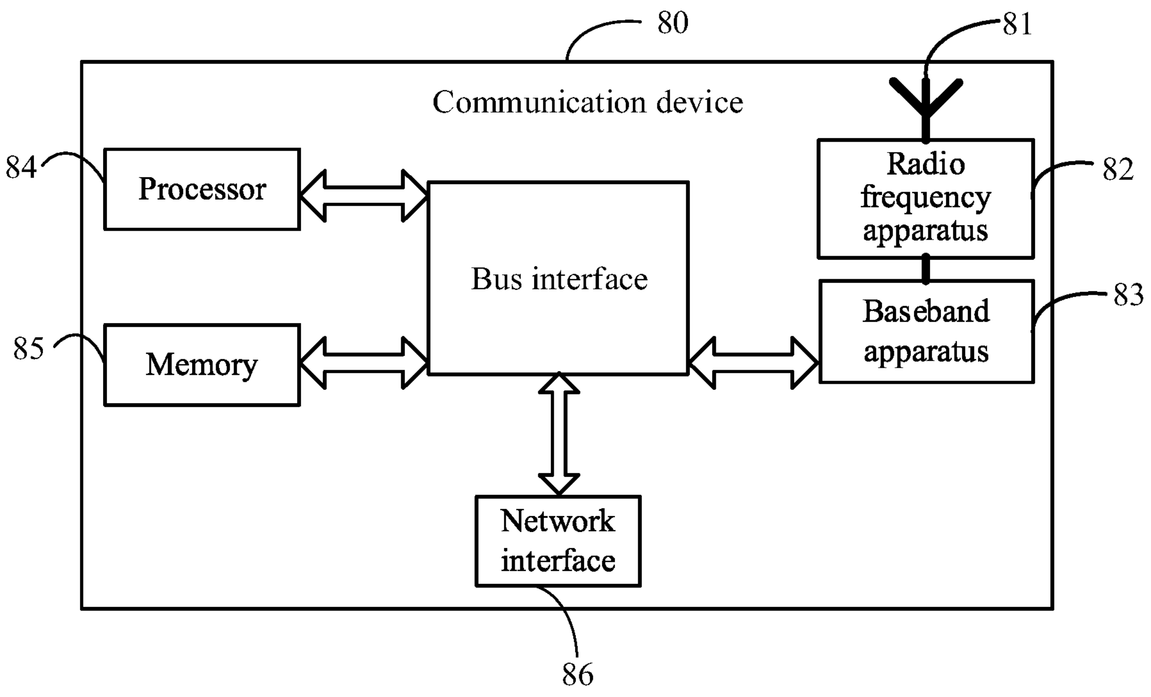
FIG. 8 is a schematic diagram of a hardware structure of a communication device according to an embodiment of this application.

Specifically, an embodiment of this application further provides a communication device. As shown in FIG. 8, the communication device 80 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The frequency band processing apparatus may be located in the baseband apparatus 83. The method performed by the communication device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke a program in the memory 85 to perform the operation of the network device shown in the foregoing method embodiment.

The baseband apparatus 83 may further include a network interface 86, configured to exchange information with the radio frequency apparatus 82, where the interface is, for example, a common public radio interface (CPRI).

Specifically, the communication device in this embodiment of the present invention further includes a program or instructions stored in the memory 85 and capable of running on the processor 84. When the processor 84 invokes the program or instructions in the memory 85, the method performed by each module shown in FIG. 5 or FIG. 6 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the downlink transmit power control method is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communication interface. The communication interface is coupled to the processor. The processor is configured to run a program or instructions to implement each process of the foregoing embodiment of the downlink transmit power control method, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a computer program product. The computer program product is executed by at least one processor to implement each process of the foregoing embodiment of the downlink transmit power control method, with the same technical effect achieved. To avoid repetition, details are not described herein again.

It should be noted that in this specification, the term "comprise", "include", or any variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the related art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A downlink transmit power control method, comprising:

receiving, by a child node, a downlink transmission carrying a measurement signal and sent by a parent node on a reference resource;

determining, by the child node, a power adjustment value of downlink transmit power of the parent node based on a measurement result of the measurement signal; and sending, by the child node, a power adjustment command to the parent node, wherein the power adjustment command is used to indicate the power adjustment value, wherein before determining, by the child node, the power adjustment value of downlink transmit power of the parent node based on the measurement result of the measurement signal, the method further comprises:

when the downlink transmission carries a plurality of measurement signals, selecting, by the child node based on predefined or preconfigured priorities of the plurality of measurement signals, the measurement signal used to determine the power adjustment value.

2. The method according to claim 1, further comprising at least one of the following:

determining, by the child node, the reference resource, and indicating the reference resource to the parent node or a centralized unit;

receiving, by the child node, the reference resource indicated by the parent node or the centralized unit; or obtaining, by the child node, the reference resource prescribed in a protocol.

3. The method according to claim 1, wherein the measurement result of the measurement signal is a measurement result of the measurement signal received at most recent N times or within a most recent T time, wherein N is a positive integer greater than or equal to 1;

wherein the measurement result of the measurement signal received at the most recent N times or within the most recent T time comprises at least one of the following:

a measurement result of the measurement signal received at the most recent N times or within the most recent T time, relative to sending the power adjustment command by the child node;

a measurement result of the measurement signal received at the most recent N times or within the most recent T time, relative to requesting a reporting resource for sending the power adjustment command by the child node;

a measurement result of the measurement signal received at the most recent N times or within the most recent T time, relative to triggering the child node by the parent node to report the power adjustment command; or a measurement result of the measurement signal received at the most recent N times or within the most recent T time, relative to signaling of the parent node for allocating the reporting resource for sending the power adjustment command.

4. The method according to claim 1, wherein the measurement signal comprises at least one of the following: a physical downlink control channel (PDCCH), a physical downlink shared channel (PDSCH), a PDCCH demodulation reference signal (DMRS), a PDSCH DMRS, a synchronization signal and PBCH block (SSB), a secondary synchronization signal (SSS), a primary synchronization signal (PSS), a physical broadcast channel (PBCH) DMRS, or a channel state information reference signal (CSI-RS).

5. The method according to claim 1, wherein the sending, by the child node, a power adjustment command to the parent node comprises: sending, by the child node, the power adjustment command to the parent node within a first preset time period from the reference resource.

6. The method according to claim 1, wherein the measurement result of the measurement signal is a measurement result of the measurement signal within a second preset time period.

7. The method according to claim 6, wherein transmit power of the measurement signal does not change within the second preset time period; or, wherein the method further comprises:

receiving, by the child node, the second preset time period indicated by the parent node or a centralized unit; or, wherein a range of the second preset time period comprises at least a time period from M time units after a power adjustment command is sent last time to N time units before a power adjustment command is sent this time, wherein M≥0, and N≥0; or, wherein the method further comprises:

receiving, by the child node, a notification sent by the parent node or a centralized unit, wherein the notification is used to indicate that transmit power of the measurement signal changes.

8. The method according to claim 1, wherein the determining, by the child node, a power adjustment value of downlink transmit power of the parent node based on a measurement result of the measurement signal comprises:

determining, by the child node, the power adjustment value based on the measurement result of the measurement signal and at least one of the following:

transmit power of the measurement signal, indicated by the parent node; or preset reference power;

wherein the parent node indicates the transmit power of the measurement signal semi-statically or dynamically; or, wherein the preset reference power is prescribed in a protocol, configured by a centralized unit, or indicated by the parent node.

9. The method according to claim 1, wherein the determining, by the child node, a power adjustment value of downlink transmit power of the parent node based on a measurement result of the measurement signal comprises:

determining, by the child node, the power adjustment value of the downlink transmit power of the parent node based on measurement results of measurement signals carried by downlink transmissions sent on a plurality of reference resources;

wherein the determining, by the child node, the power adjustment value of the downlink transmit power of the parent node based on measurement results of measurement signals carried by downlink transmissions sent on a plurality of reference resources comprises:

filtering, by the child node by using a preset filter, the measurement results of the measurement signals carried by the downlink transmissions sent on the plurality of reference resources, to obtain a filtered measurement result; and determining, by the child node, the power adjustment value of the downlink transmit power of the parent node based on the filtered measurement result;

or obtaining, by the child node, a plurality of power adjustment values based on the measurement results of the measurement signals carried by the downlink transmissions sent on the plurality of reference resources; and filtering, by the child node, the plurality of power adjustment values based on a preset filter, to obtain the power adjustment value of the downlink transmit power of the parent node;

wherein the method further comprises at least one of the following:

determining, by the child node, a parameter of the preset filter, and indicating the parameter to the parent node or a centralized unit;

receiving, by the child node, the parameter of the preset filter indicated by the parent node or the centralized unit; or obtaining, by the child node, the parameter of the preset filter prescribed in a protocol.

10. The method according to claim 1, wherein the power adjustment value is to adjust an upper limit, a lower limit, and/or an average value of the downlink transmit power; or, wherein at least one granularity is used in the power adjustment command to indicate the power adjustment value.

11. The method according to claim 1, wherein the sending, by the child node, a power adjustment command to the parent node comprises:

sending, by the child node, a plurality of power adjustment commands to the parent node, wherein a sum of values indicated in the plurality of power adjustment commands is the power adjustment value; or, wherein the sending, by the child node, a power adjustment command to the parent node comprises:

determining, by the child node based on a preset table, a sequence number corresponding to the power adjustment value, wherein the table comprises a plurality of correspondences, and the correspondences are correspondences between power adjustment values and sequence numbers; and sending, by the child node to the parent node, the power adjustment command carrying the sequence number corresponding to the power adjustment value; or, wherein in a case of a carrier aggregation, the power adjustment command comprises a power adjustment value corresponding to each aggregated carrier, and the power adjustment value corresponding to each aggregated carrier is arranged based on a sequence number of each aggregated carrier.

12. A downlink transmit power control method, comprising:

sending, by a parent node on a reference resource, a downlink transmission carrying a measurement signal to a child node, wherein the downlink transmission carries a plurality of measurement signals, to instruct the child node to select, based on predefined or preconfigured priorities of the plurality of measurement signals, the measurement signal used to determine a power adjustment value;

receiving, by the parent node, the power adjustment command sent by the child node, wherein the power adjustment command is used to indicate a power adjustment value, and the power adjustment value is determined by the child node based on a measurement result of the measurement signal; and adjusting, by the parent node, downlink transmit power based on reference power and the power adjustment value.

13. The method according to claim 12, wherein the reference power is one of the following: transmit power of the measurement signal; and preset reference power.

14. The method according to claim 12, further comprising at least one of the following:

receiving, by the parent node, the reference resource indicated by the child node;

determining, by the parent node, the reference resource;

receiving, by the parent node, the reference resource indicated by a centralized unit; or obtaining, by the parent node, the reference resource prescribed in a protocol.

15. The method according to claim 12, wherein the measurement signal comprises at least one of the following: a PDCCH, a PDSCH, a PDCCH DMRS, a PDSCH DMRS, an SSB, an SSS, a PSS, a PBCH DMRS, or a CSI-RS.

16. The method according to claim 12, wherein the sending, by a parent node on a reference resource, a downlink transmission carrying a measurement signal to a child node comprises:

sending, by the parent node, the measurement signal by using constant transmit power within a second preset time period;

wherein the method further comprises:

indicating, by the parent node, the second preset time period to the child node; or, wherein the method further comprises:

when transmit power of the measurement signal changes, sending, by the parent node to the child node, a notification used to indicate that the transmit power of the measurement signal changes.

17. The method according to claim 13, further comprising:

indicating, by the parent node, the transmit power of the measurement signal to the child node semi-statically or dynamically; or, wherein the method further comprises at least one of the following:

indicating, by the parent node, the preset reference power to the child node;

obtaining, by the parent node, the preset reference power indicated by a centralized unit; or obtaining, by the parent node, the preset reference power prescribed in a protocol; or, wherein the method further comprises:

filtering, by the parent node by using a preset filter, transmit power of measurement signals carried by downlink transmissions on a plurality of reference resources, and using filtered transmit power as the reference power;

wherein the method further comprises at least one of the following:

receiving, by the parent node, a parameter of the preset filter sent by the child node;

determining, by the parent node, the parameter of the preset filter;

receiving, by the parent node, the parameter of the preset filter indicated by a centralized unit; or obtaining, by the parent node, the parameter of the preset filter prescribed in a protocol.

18. The method according to claim 12, wherein the adjusting, by the parent node, downlink transmit power based on reference power and the power adjustment value comprises:

adjusting, by the parent node, an upper limit, a lower limit, and/or an average value of the downlink transmit power based on the reference power and the power adjustment value; and/or adjusting energy of each resource element, power spectral density, or total transmit power of the downlink transmission; or, wherein the receiving, by the parent node, a power adjustment command sent by the child node comprises:

receiving, by the parent node, a plurality of power adjustment commands sent by the child node, wherein a sum of values indicated in the plurality of power adjustment commands is the power adjustment value; or, wherein the power adjustment command carries a sequence number corresponding to the power adjustment value; and after the receiving, by the parent node, a power adjustment command sent by the child node, the method further comprises:

determining, by the parent node based on a preset table, the power adjustment value corresponding to the sequence number in the power adjustment command, wherein the table comprises a plurality of correspondences, and the correspondences are correspondences between power adjustment values and sequence numbers; or, wherein in a case of a carrier aggregation, the power adjustment command comprises a power adjustment value of each aggregated carrier, and the power adjustment value of each aggregated carrier is arranged based on a sequence number of each aggregated carrier.

19. A communication device, comprising:

a processor implemented in hardware, a memory, and a program or instructions stored in the memory and capable of running on the processor, wherein the program or instructions, when executed by the processor, cause the communication device to perform:

receiving a downlink transmission carrying a measurement signal and sent by a parent node on a reference resource;

determining a power adjustment value of downlink transmit power of the parent node based on a measurement result of the measurement signal; and sending a power adjustment command to the parent node, wherein the power adjustment command is used to indicate the power adjustment value, wherein the communication device is further caused to perform:

when the downlink transmission carries a plurality of measurement signals, selecting, by the child node based on predefined or preconfigured priorities of the plurality of measurement signals, the measurement signal used to determine the power adjustment value.

* * * * *